United States Patent
Baker et al.

(10) Patent No.: US 12,039,067 B2
(45) Date of Patent: Jul. 16, 2024

(54) METHOD AND APPARATUS OF SECURING DATA

(71) Applicant: Wind River Systems, Inc., Alameda, CA (US)

(72) Inventors: Arlen Baker, Alameda, CA (US); Matt Jones, Portland, OR (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 9 days.

(21) Appl. No.: 17/301,019

(22) Filed: Mar. 22, 2021

(65) Prior Publication Data

US 2022/0300632 A1   Sep. 22, 2022

(51) Int. Cl.
*G06F 21/62* (2013.01)
*H04L 9/06* (2006.01)
*G06F 8/65* (2018.01)
*H04L 9/00* (2022.01)

(52) U.S. Cl.
CPC ........ *G06F 21/6218* (2013.01); *H04L 9/0643* (2013.01); *G06F 8/65* (2013.01); *H04L 9/50* (2022.05)

(58) Field of Classification Search
CPC ..... G06F 21/6218; G06F 8/65; H04L 9/0643; H04L 9/50
See application file for complete search history.

(56) References Cited

U.S. PATENT DOCUMENTS

| | | | |
|---|---|---|---|
| 11,151,276 B1* | 10/2021 | Wang | G06Q 20/02 |
| 2017/0250972 A1* | 8/2017 | Ronda | H04L 9/0891 |
| 2019/0035014 A1* | 1/2019 | Bell | H04L 9/0637 |
| 2019/0287027 A1* | 9/2019 | Franceschini | H04L 9/3239 |
| 2020/0004855 A1* | 1/2020 | Chepak, Jr. | G06F 16/2365 |
| 2020/0007343 A1* | 1/2020 | Evans | H04L 9/0643 |
| 2020/0007344 A1* | 1/2020 | Chepak, Jr. | H04L 9/50 |
| 2021/0021423 A1* | 1/2021 | Latorre | G06Q 10/10 |
| 2021/0211299 A1* | 7/2021 | Hussain | H01Q 15/14 |
| 2022/0108308 A1* | 4/2022 | Hanebeck | G06Q 10/083 |
| 2022/0169258 A1* | 6/2022 | Samarthyam | H04L 67/12 |
| 2022/0300632 A1* | 9/2022 | Baker | G06F 21/6218 |

* cited by examiner

*Primary Examiner* — Gary S Gracia
(74) *Attorney, Agent, or Firm* — Fay Kaplun & Marcin, LLP

(57) ABSTRACT

A manner of securing data that includes receiving a first plurality of hashes corresponding to data stored in a database, writing the first plurality of hashes to a private distributed ledger technology (DLT), sealing each block of the private DLT when a predetermined criteria is met to create a plurality of sealed blocks and writing a second plurality hashes corresponding to the plurality of sealed blocks to a public DLT.

14 Claims, 2 Drawing Sheets

METHOD AND APPARATUS OF SECURING DATA

BACKGROUND INFORMATION

Software may undergo many changes/updates throughout its lifetime. As such, it may be of importance to keep a log of the changes that are made to software, who made them, when they were made, where they were made, etc. in case such information is needed at a future date. Such data logs may be stored in a database within an organization.

SUMMARY

Some exemplary embodiments are related to a method that includes receiving a first plurality of hashes corresponding to data stored in a database, writing the first plurality of hashes to a private distributed ledger technology (DLT), sealing each block of the private DLT when a predetermined criteria is met to create a plurality of sealed blocks and writing a second plurality hashes corresponding to the plurality of sealed blocks to a public DLT.

Other exemplary embodiments are related to a system having a database configured to store a data and a first plurality of hashes corresponding to the data. The system further includes a private distributed ledger technology (DLT) server configured to write the first plurality of hashes to a private DLT and seal each block of the private when a predetermined criteria is met to create a plurality of sealed blocks. The system also includes a public chain server configured to write a second plurality hashes corresponding to the plurality of sealed blocks to a public DLT.

Still further exemplary embodiments are related to a blockchain server configured to perform operations. The operations include receiving a first plurality of hashes corresponding to data stored on a database, writing the first plurality of hashes to a private blockchain, sealing each block of the private blockchain when a predetermined criteria is met to create a plurality of sealed blocks and transmitting a second plurality hashes corresponding to the plurality of sealed blocks to a public chain server to be written to a public chain.

DETAILED DESCRIPTION

Figure 1:
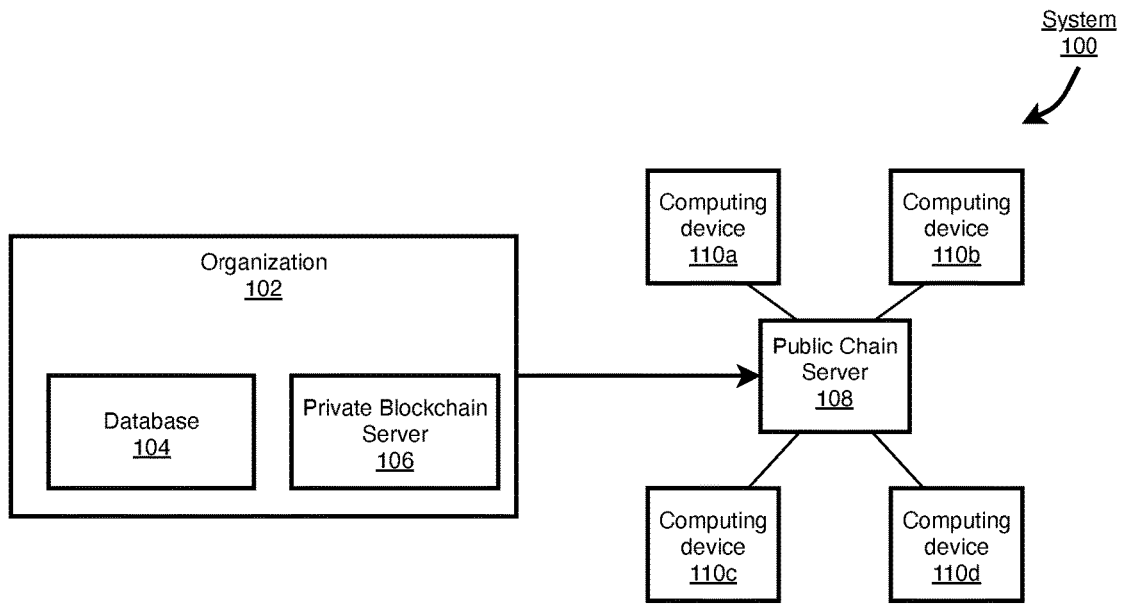
FIG. 1 shows an exemplary system used to secure data according to the exemplary embodiments.

The exemplary embodiments may be further understood with reference to the following description and the related appended drawings, wherein like elements are provided with the same reference numerals. The exemplary embodiments are related to a device, a system, and a method for securing data such as, for example, software logs. The exemplary embodiments may form a private blockchain based on first hashes of the data and write a second hash for each sealed block of the private blockchain to a public chain.

The exemplary embodiments are described with regard to forming a private blockchain using first hashes of data on a database and then writing a second hash for each sealed block of the private blockchain onto a public chain. However, the particular components and inputs/outputs described with respect to the exemplary embodiments are only illustrative and variations to the components, inputs, and/or outputs may be used within the scope of the exemplary embodiments. In a first example, the use of blockchain is only exemplary as the exemplary embodiments may be implemented using any distributed ledger technology (DLT), e.g., Directed Acyclic Graph (DAG), Corda, etc. In a second example, the use of software logs is only exemplary and the exemplary embodiments may be applied to any data stored on a database that needs to be secured. For example, the data may include security data or mining data that needs to be secured.

When data is stored on a database internal to an organization, such data may be in the form of text files (or other file formats), which are susceptible to malicious modification. In some scenarios, such data may include logs pertaining to any changes made to software code (e.g., who made the changes, what changes were made, when the changes were made, where the changes were made, etc.) The data may be hashed (e.g., given a corresponding bit string value) and the hashes may be stored on a public chain, which is highly distributed. As a result, the hashes are less likely to be maliciously changed since the hashes are stored on so many different computing devices. However, the costs associated with storing data on a public chain are high due to the amount of data to be stored.

The exemplary embodiments provide a mechanism to create a private blockchain having a plurality of blocks based on first hashes of data from a database and writing a second hash for each sealed block of the private blockchain to a public chain. As a result, the benefit of securing data on blockchain is realized without the associated costs because the blockchain is private and the data stored on the public chain (and the associated costs) is significantly less than if the first hashes are stored on the public chain. In addition, the highly distributed nature of a public chain allows for an added layer of verification (public chain against private blockchain in addition to blocks of private blockchain against data on the database).

Figure 2:
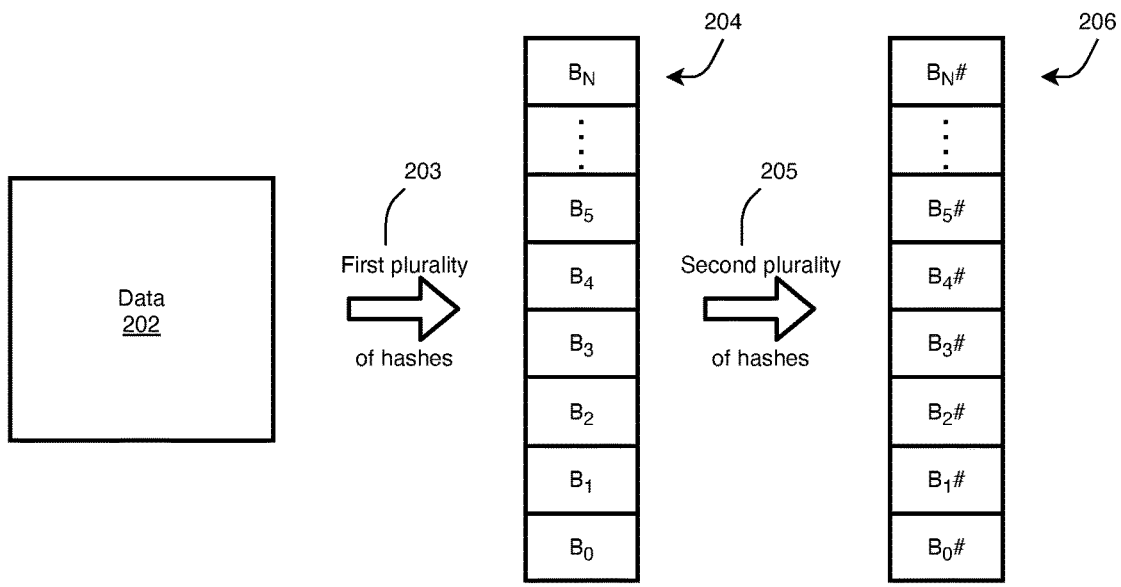
FIG. 2 shows an exemplary data flow for securing data according to the exemplary embodiments.

The following description will be made with reference to FIGS. 1 and 2. FIG. 1 shows an exemplary system 100 used to secure data according to the exemplary embodiments. FIG. 2 shows an exemplary data flow for securing data according to the exemplary embodiments. The system 100 may represent data logging environment in which data is secured. The system 100 may include an organization 102, including a database 104 and a private blockchain server 106, and a public chain server 108 communicatively coupled to a plurality of computing devices.

The exemplary embodiments are described with regard to a system 100 including servers as separate components that individually perform respective operations with inputs and outputs being exchanged between one another (e.g., via direct communication pathways, via a wired and/or wireless network, etc.). However, this configuration of separate servers having a communication functionality is only exemplary. According to other exemplary embodiments, one or more of the functions described as being performed by the servers of the system 100 may be represented in a single processing device or a single function may be distributed to multiple processors in one or more devices. The servers of the system 100 may therefore represent the operations that are performed within the device. The servers may also represent modular components that provide further functionalities when incorporated with a main processing device (e.g., the private blockchain server 106 may be implemented as the main processing device with the database 104 and the public chain server 108 being modular components that interact with the private blockchain server 106). In further exemplary embodiments, the system 100 may be represented in a cloud or with virtual machines. When implemented in a cloud or with virtual machines, the functionalities described for the servers 106 and 108 of the system 100 may be instructions that may cause other components or other devices to perform corresponding operations.

The organization 102 may represent any environment or company that creates and/or modifies software. The database 104 may include data 202 pertaining to changes made source code of a software. For example, the data 202 on the database 104 may include software logs of what changes are made, who made the changes, when the changes were made, where the changes were made, etc. In some embodiments, the logs may be text files. In some embodiments, the software logs may include hashes of files in software development, hashes of database records that relate to tests, or anything related to software development. The source code may be a fundamental component from which a computer program is created. For example, the source code may be computer code (e.g., using any programming language, script language, etc.) that is compiled (e.g., to generate object code) to create an executable program.

Since data 202 on the database 104 may be maliciously changed relatively easily due to the high modifiable nature of text files, this data (e.g., software logs pertaining to changes) is hashed to create a first plurality of hashes 203 representative of the data 202. The private blockchain server 106 may be configured to write the first plurality of hashes 203 to a private permission distributed ledger 204 (blockchain) within the organization 102. The resulting blockchain may include a plurality of blocks ($B_0 \ldots B_N$) formed using the first plurality of hashes 103. In some embodiments, each block may be sealed after a predetermined number of hashes. In some embodiments, each block may alternatively be sealed after a predetermined time period (e.g., one day). As described above, the exemplary embodiments are not limited to using blockchain as the DLT. However, other DLTs have a corresponding concept to blocks or discrete containers and the term blocks should be understood to encompass the discrete containers of any other DLTs.

The public chain server 108 is configured to write a hash (second plurality of hashes 205) of each sealed block ($B_0 \ldots B_N$) to a public chain 206. In some embodiments, the public chain server 108 stores the public chain 206 ($B_0\# \ldots B_N\#$) on a plurality of computing devices 110a-110d. Although only four computing devices 110a-110d are shown in FIG. 1, it should be noted that the public chain server 108 may be (and most likely is) communicatively coupled to a significantly greater number of computing devices 110. As a result, the public chain 206 is highly distributed, thus ensuring that the chain cannot be maliciously modified on all of the computing devices 110 communicatively coupled to the public chain server 108. Because the data stored on the public chain 206 includes hashes of the blocks of the blockchain 204, the amount of data stored on the public chain is minimized, thus also minimizing the associated costs with storing data on a public chain. In addition, the hash ($B_0\# \ldots B_N\#$) on the public chain 206 may be compared with a hash of a corresponding block ($B_0 \ldots B_N$) from the private blockchain 204 to determine if the public hash matches the private block and the private block may also be compared with the data 202 to which it corresponds without requiring the including of any filenames or other information on the public chain 206. As a result, a two-tiered level of security is achieved which minimizes costs associated with storing data on a public chain.

Figure 3:
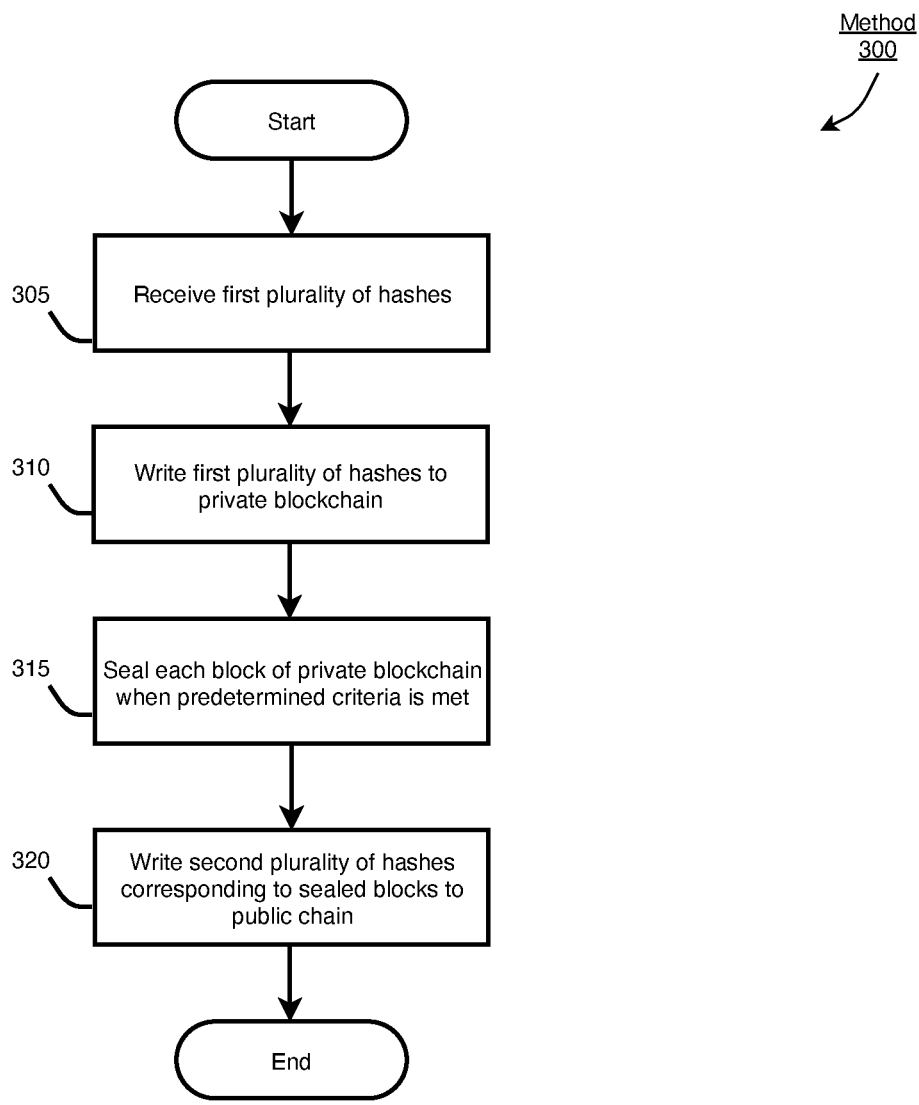
FIG. 3 shows an exemplary method for securing data according to the exemplary embodiments.

FIG. 3 shows an exemplary method 300 for securing data according to the exemplary embodiments. The method 300 may relate to the operations performed by the system 100 in writing a first plurality of hashes corresponding to data 202 to a private blockchain 204 and writing a second plurality of hashes 205 corresponding to sealed blocks ($B_0 \ldots B_N$) of the private blockchain 204 to a public chain 206 ($B_0\# \ldots B_N\#$). The method 300 will be described with regard to the system 100 of FIG. 1 and the data flow depicted in FIG. 2.

In 305, the private blockchain server 106 receives the first plurality of hashes 203 corresponding to the data 202 from the database 104. In 310, the private blockchain server 106 writes the first plurality of hashes 203 to the private blockchain 204. In 315, the private blockchain server 106 seals each block ($B_0 \ldots B_N$) when a predetermined criteria is met. As noted above, this predetermined criteria may be a target number of hashes and/or a target time period (e.g., after a day). The private blockchain 204 provides a layer of security for the data provided by a blockchain while also being free since it is maintained within the organization 102. However, because the private blockchain 204 is within the organization, it is not highly distributed.

Every time a block of the private blockchain 204 is sealed, a corresponding hash for that sealed block is created. In 320, the public chain server 108 writes the second plurality of hashes 205 ($B_0\# \ldots B_N\#$) corresponding to the sealed blocks ($B_0 \ldots B_N$) to the public chain 206. The public chain 206 provides another layer of security since the hashes (second plurality of hashes 205) stored on the public chain 206 are hashes of blocks ($B_0 \ldots B_N$), which themselves are based on hashes (first plurality of hashes 203). In addition, the highly distributed nature of the public chain 206 ensures that the chain cannot be maliciously changed on all of the computers of the public chain.

The exemplary embodiments provide a device, system, and method for securing data by writing a first plurality of hashes corresponding to the data to a private blockchain within an organization and, subsequently, writing a second plurality of hashes corresponding to sealed blocks of the private blockchain to a public chain. As a result, a two-tiered level of security is provided which also takes advantage of the highly distributed nature of a public chain. Because hashes (second plurality of hashes 205) are stored on the public chain, the costs associated with storing data on a public chain are minimized (compared to storing the data itself or hashes of the data on the public chain).

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   receiving a first plurality of hashes corresponding to data stored in a database;
   writing the first plurality of hashes to a private distributed ledger technology (DLT);
   sealing each block of the private DLT to create a plurality of sealed blocks, wherein each block of the private DLT is sealed when a number of first hashes corresponding to each block is determined to be a target number of first hashes; and
   writing a second plurality hashes corresponding to the plurality of sealed blocks to a public DLT.

2. The method of claim 1, wherein the data includes software logs pertaining to changes made to software code.

3. The method of claim 1, wherein the data includes text files.

4. The method of claim 1, wherein the database and the private DLT are maintained within an organization, and wherein the public DLT is maintained on a plurality of computing devices.

5. The method of claim 1, wherein the private DLT and the public DLT comprise blockchains.

6. A system, comprising:
   a database configured to store a data and a first plurality of hashes corresponding to the data;
   a private distributed ledger technology (DLT) server configured to write the first plurality of hashes to a private DLT and seal each block of the private DLT when a number of first hashes corresponding to each block is determined to be a target number of first hashes; and
   a public chain server configured to write a second plurality hashes corresponding to the plurality of sealed blocks to a public DLT.

7. The system of claim 6, wherein the data includes software logs pertaining to changes made to software code.

8. The system of claim 6, wherein the data includes text files.

9. The system of claim 6, wherein the database and the private blockchain are maintained within an organization, and wherein the public chain is maintained on a plurality of computing devices communicatively coupled to the public chain server.

10. The system of claim 6, wherein the private DLT and the public DLT comprise blockchains.

11. A blockchain server configured to perform operations comprising:
    receiving a first plurality of hashes corresponding to data stored on a database; writing the first plurality of hashes to a private blockchain;
    sealing each block of the private blockchain to create a plurality of sealed blocks, wherein each block of the private blockchain is sealed when a number of first hashes corresponding to each block is determined to be a target number of first hashes; and
    transmitting a second plurality hashes corresponding to the plurality of sealed blocks to a public chain server to be written to a public chain_wherein the second plurality hashes are significantly less than the first plurality hashes.

12. The blockchain server of claim 11, wherein the data includes software logs pertaining to changes made to software code.

13. The blockchain server of claim 11, wherein the data includes text files.

14. The blockchain server of claim 11, wherein the database and the private blockchain are maintained within an organization, and wherein the public chain is maintained on a plurality of computing devices communicatively coupled to the public chain server.

* * * * *